United States Patent
Goli et al.

(10) Patent No.: US 10,484,636 B2
(45) Date of Patent: Nov. 19, 2019

(54) REDUNDANCY IN ACTIVE PIXEL SENSORS

(71) Applicant: TEXAS INSTRUMENTS INCORPORATED, Dallas, TX (US)

(72) Inventors: Sravana Kumar Goli, Bengaluru (IN); Jeevan Mithra, Bengaluru (IN); Nagesh Surendranath, Plano, TX (US); Sandeep Kesrimal Oswal, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/926,025

(22) Filed: Mar. 20, 2018

(65) Prior Publication Data

US 2019/0297294 A1  Sep. 26, 2019

(51) Int. Cl.
*H04N 5/3745* (2011.01)
*H04N 5/361* (2011.01)
*H04N 5/365* (2011.01)
*H04N 5/374* (2011.01)
*H04N 5/363* (2011.01)

(52) U.S. Cl.
CPC ......... *H04N 5/37452* (2013.01); *H04N 5/361* (2013.01); *H04N 5/363* (2013.01); *H04N 5/3658* (2013.01); *H04N 5/374* (2013.01)

(58) Field of Classification Search
CPC .. H04N 5/37452; H04N 5/374; H04N 3/1562; H04N 3/155; H04N 5/361; H04N 5/363
See application file for complete search history.

(56) References Cited

U.S. PATENT DOCUMENTS 6,323,476 B1 * 11/2001 Guidash ................. H04N 3/155
250/208.1

* cited by examiner

*Primary Examiner* — Ahmed A Berhan
(74) *Attorney, Agent, or Firm* — John R. Pessetto; Charles A. Brill; Frank D. Cimino

(57) ABSTRACT

An active pixel sensor a plurality of sensor pixels disposed in a row, a plurality of sensor pixels in a column, and steering circuitry coupled to each of the sensor pixels. Each of the sensor pixels includes a first pixel circuit, and a second pixel circuit. For each of the sensor pixels, the steering circuitry includes a first switch, a second switch, a third switch, and a fourth switch. The first switch and the second switch are connected in series to route an input signal to the first pixel circuit. The third switch and a fourth switch are connected in parallel to route the input signal to the second pixel circuit.

17 Claims, 5 Drawing Sheets

REDUNDANCY IN ACTIVE PIXEL SENSORS

BACKGROUND

An active pixel sensor is an integrated circuit that includes an array of sensors (e.g., photodetectors) arranged as rows and columns to operate as an image sensor. During the manufacture process, one or more of the pixels and/or one or more rows or columns of pixels may be identified as defective (e.g., short circuits can be created between two metals in the integrated circuit during manufacture). While some individual pixel defects and even a very small number of row/column defects (e.g., less than 5) will not render the entire integrated circuit defective, a large number of individual pixel defects or a smaller number (e.g., more than 5) of row/column defects renders the entire integrated circuit defective. The cost of manufacturing an active pixel sensor device is relatively high because each active pixel sensor device may occupy the entire area of a 12 inch wafer.

SUMMARY

An active pixel sensor includes circuitry to improve device yield. In one example, an active pixel sensor a plurality of sensor pixels disposed in a row, a plurality of sensor pixels in a column, and steering circuitry coupled to each of the sensor pixels. Each of the sensor pixels includes a first pixel circuit, and a second pixel circuit. For each of the sensor pixels, the steering circuitry includes a first switch, a second switch, a third switch, and a fourth switch. The first switch and the second switch are connected in series to route an input signal to the first pixel circuit. The third switch and a fourth switch are connected in parallel to route the input signal to the second pixel circuit.

In another example, an imaging system includes an active pixel sensor. The active pixel sensor includes an array of sensor pixels, a row defect memory, and a column defect memory. The array of sensor pixels is arranged as a plurality of rows and a plurality of columns. Each of the sensor pixels includes a first pixel circuit and a second pixel circuit. The row defect memory is to store information indicating whether a row in which a given one of the first pixel circuits is disposed is defective. The column defect memory is to store information indicating whether a column in which a given one of the first pixel circuits is disposed is defective. For each of the columns, the active pixel sensor includes a first column multiplexer coupled to the row defect memory, the column defect memory, and a column of the sensor pixels. The first column multiplexer is configured to select the second pixel circuit responsive to the information stored in the row defect memory indicating that a row in which the first pixel circuit is disposed is defective, or the information stored in the column defect memory indicating that the column in which the first pixel circuit is disposed is defective.

In a further example, an active pixel sensor includes a plurality of sensor pixels disposed in a row, a plurality of sensor pixels disposed in a column, steering circuitry coupled to each of the sensor pixels, a row defect memory, a column defect memory, a row multiplexer, a first column multiplexer, and a second column multiplexer. The row multiplexer coupled to the row defect memory and the row of sensor pixels. The first column multiplexer (also referred to herein as a column output multiplexer) coupled to the row defect memory, the column defect memory, and the outputs of sensor pixels. The second column multiplexer (also referred to herein as a global column signal multiplexer) coupled to the column of sensor pixels. Each of the sensor pixels includes a first pixel circuit, and a second pixel circuit. For each of the sensor pixels the steering circuitry includes a first switch, a second switch, a third switch, and a fourth switch. The first switch and the second switch are connected in series to couple the first pixel circuit to an input terminal. The third switch and the fourth switch are connected in parallel to couple the second pixel circuit to the input terminal.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Yield of large active pixel sensors may be relatively low due to the large number of rows and columns implemented (e.g., more than 3000 rows and more than 4000 columns) on the device and the relatively low number of acceptable row/column failures (e.g., 5 or less). Yield can be improved by implementing redundancy in the active pixel sensor. For example, redundancy may be provided at the pixel level by including redundant circuitry for each pixel. The active pixel sensors disclosed herein include redundant pixel circuitry, pixel circuitry arranged to reduce the incidence of failure of the redundant pixel circuitry, and circuitry to enable operation of the redundant pixel circuitry. The active pixel sensors disclosed herein also include circuitry and features that reduce the incidence of failures the affect the entire panel. Accordingly, the active pixel sensors disclosed herein provide a significant yield improvement over other large area active pixel sensors.

Figure 1:
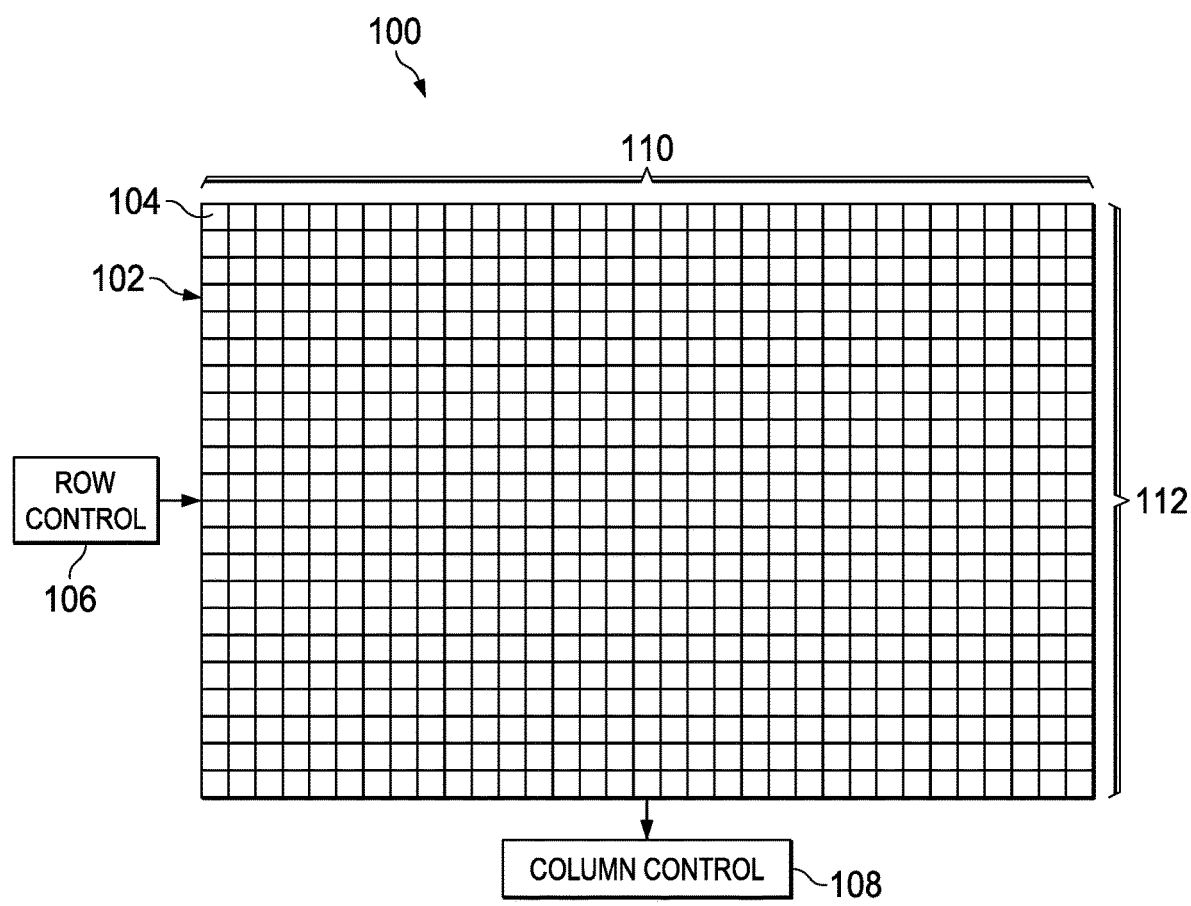
FIG. 1 shows a block diagram of an active pixel sensor in accordance with various examples.

FIG. 1 shows a block diagram of an active pixel sensor 100 in accordance with various examples. The active pixel sensor 100 includes an array of sensor pixels 102 (such as sensor pixel 104) formed as rows 112 and columns 110 of sensor pixels. Each of the rows 112 includes a plurality of sensor pixels 104 and each of the columns 110 includes a plurality of sensor pixels 104. In some embodiments, the sensor pixels 104 of the array of sensor pixels 102 are constructed utilizing complementary metal-oxide-semiconductor (CMOS) technology. Each of the sensor pixels 104 includes, in an embodiment, photodetectors configured to sense visible light (photons) and/or other electromagnetic waves (e.g., infrared waves, ultraviolet waves, microwaves, radio waves, etc.) and convert the electromagnetic waves into an electrical signal (e.g., a voltage and/or current) based on the intensity of the received electromagnetic waves. Each sensor pixel 104 also includes, in an embodiment, circuitry (e.g., transistors) to amplify and read the electrical signal generated by the photodetector. Each sensor pixel 104 is controlled by row control circuitry 106 and column control circuitry 108. For example, the row control circuitry 106 provides control signals for an entire row of sensor pixels while the column control circuitry 108 provide control signals for an entire column of sensor pixels. The electrical signals generated by the sensor pixels 104 are read by read circuitry (not shown), which, in some implementations, includes sampling circuitry, multiplexers, drivers, and/or other circuitry. Each of the sensor pixels 104 includes circuitry implementing two pixels. That is, each sensor pixel includes pixel circuitry referred to as nominal pixel circuitry, and pixel circuitry referred to a redundant pixel circuitry. Within the row and column in which a sensor pixel 104 is disposed, the nominal pixel circuitry of the row's sensor pixels forms a nominal sub-row, and the nominal pixel circuitry of the column's sensor pixels forms a nominal sub-column. Similarly, the redundant pixel circuitry of the row's sensor pixels forms a redundant sub-row, and the redundant pixel circuitry of the column's sensor pixels forms a redundant sub-column.

Figure 2:
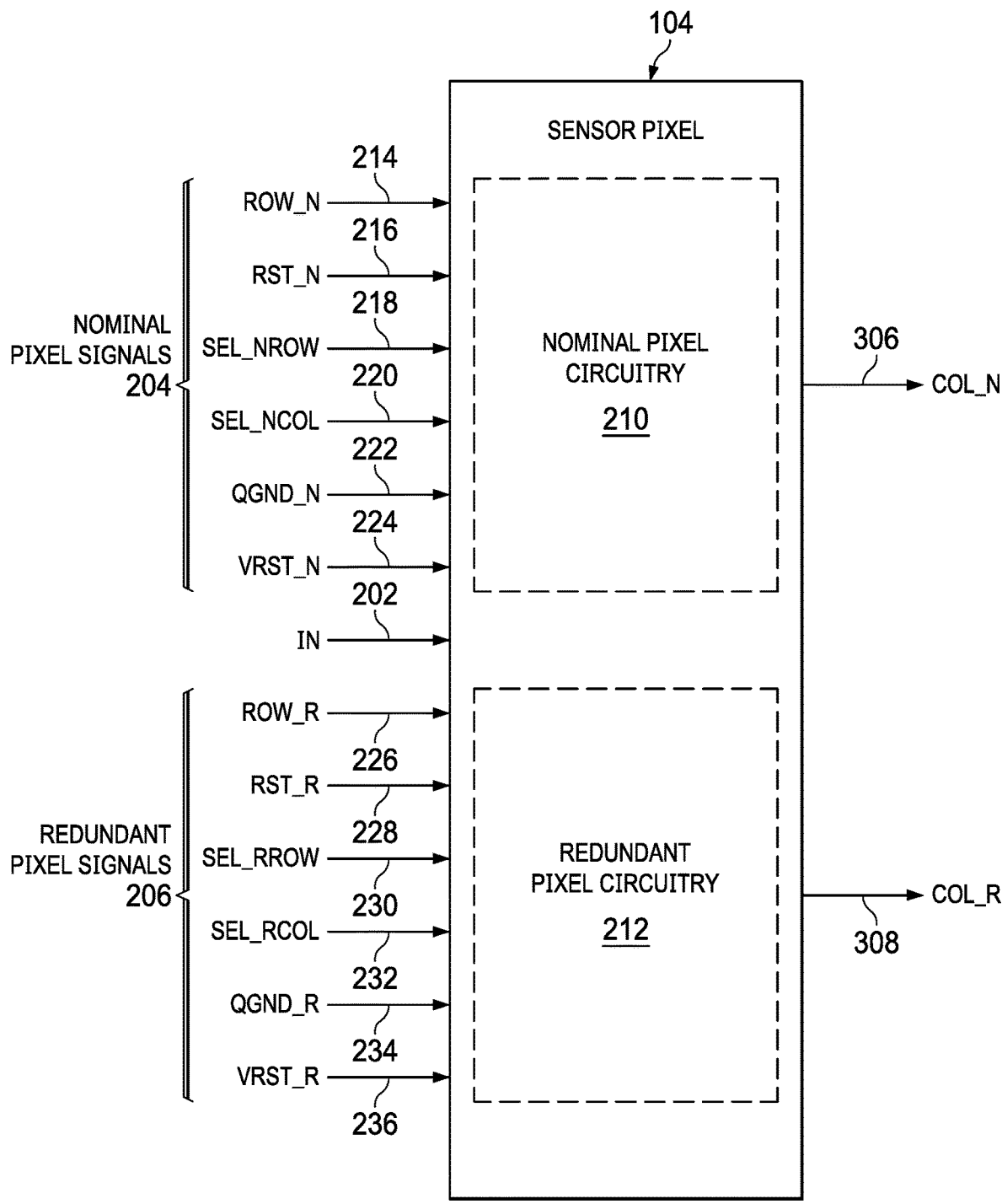
FIG. 2 shows signal inputs to and output from a sensor pixel of an active pixel sensor in accordance with various examples.

FIG. 2 shows an example of a sensor pixel 104 and signal inputs to and output from the sensor pixel 104 in accordance with the present disclosure. The sensor pixel 104 includes nominal pixel circuitry 210 and redundant pixel circuitry 212. The signals input to the sensor pixel 104 include nominal pixel control signals 204, redundant pixel control signals 206, and an input signal 202. The input signal 202 is the output of a photodetector associated with the sensor pixel 104 and is selectably provided to one of the nominal pixel circuitry 210 or the redundant pixel circuitry 212 within the sensor pixel 104. The nominal pixel control signals 204 control the operation of the nominal pixel circuitry 210 in the sensor pixel 104. The redundant pixel control signals 206 control the operation of the redundant pixel circuitry 212 in the sensor pixel 104. The sensor pixel 104 generates two output signals. The output signal COL_N 306 is generated by the nominal pixel circuitry 210 as a function of the input signal 202 and the nominal pixel control signals 204. The output signal COL_R 308 is generated by the redundant pixel circuitry 212 as a function of the input signal 202 and the redundant pixel control signals 206. The output signals COL_N 306 and COL_R 308 are the input signal 202 as stored and/or routed by the nominal pixel circuitry 210 and the redundant pixel circuitry 212.

In the nominal pixel control signals 204, the signal ROW_N 214, controls an output switch of the nominal pixel circuitry 210 to enable the nominal pixel circuitry 210 to drive the output signal COL_N 306. The signal RST_N 216 controls a reset switch of the nominal pixel circuitry 210 to reset signal voltage in the nominal pixel circuitry 210. The signals SEL_NROW 218 and SEL_NCOL 220 control switches that enable routing of input signal 202 to the nominal pixel circuitry 210. The signal QGND_N 222 provides a reference for electronic components (e.g., a sampling capacitor and/or amplifier) in the nominal pixel circuitry 210. The signal VRST_N 224 sets a voltage to which the signal voltage is reset via the reset switch of the nominal pixel circuitry 210.

The redundant pixel control signals 206 control operations of the redundant pixel circuitry 212 similar to those described above with respect to the nominal pixel circuitry 210. The signal ROW_R 226 controls an output switch of the redundant pixel circuitry 212 to enable the redundant pixel circuitry 212 to drive the output signal COL_R 308. The signal RST_R 228 controls a reset switch of the redundant pixel circuitry 212 to reset signal voltage in the redundant pixel circuitry 212. The signals SEL_RROW 230 and SEL_RCOL 232 control switches that enable routing of input signal 202 to the redundant pixel circuitry 212. The signal QGND_R 234 provides a reference for electronic components (e.g., a sampling capacitor and/or amplifier) in the redundant pixel circuitry 212. The signal VRST_R 236 sets a voltage to which the sampling capacitor is reset via the reset switch of the redundant pixel circuitry 212.

Figure 3:
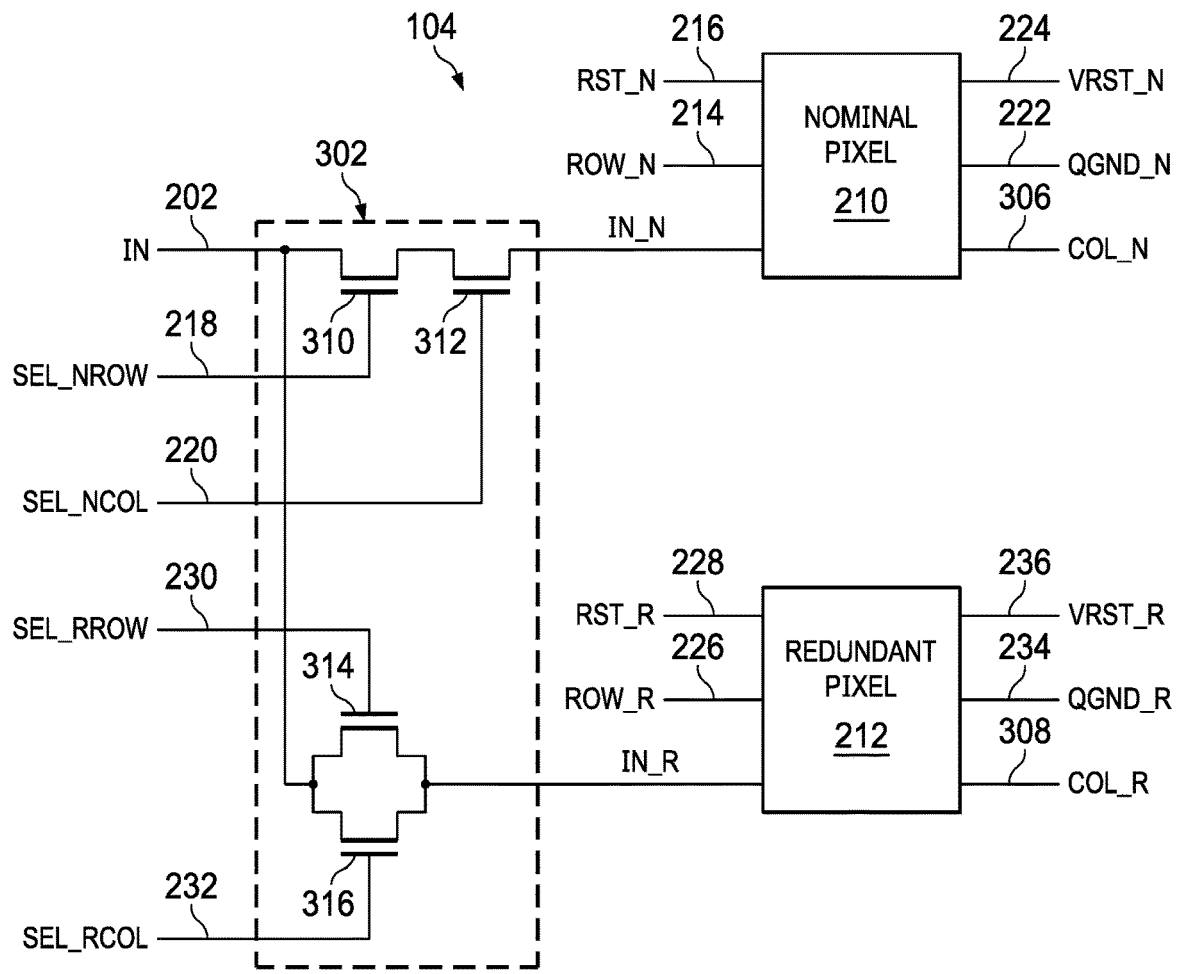
FIG. 3 shows a schematic diagram for sensor pixel circuitry of an active pixel sensor in accordance with various examples.

FIG. 3 shows a schematic diagram for the sensor pixel 104 of an active pixel sensor 100 in accordance with various examples. The sensor pixel 104 includes nominal pixel circuitry 210, redundant pixel circuitry 212, and an input routing circuit 302. The input routing circuit 302 (also referred to herein as steering circuitry 302) routes the input signal 202 to the nominal pixel circuitry 210 or the redundant pixel circuitry 212 under the control of the signals SEL_NROW 218, SEL_NCOL 220, SEL_RROW 230, and SEL_RCOL 232. The input routing circuit 302 includes a switch 310, a switch 312, a switch 314, and a switch 316. The switch 310 and the switch 312 are connected in series to route the input signal 202 to the nominal pixel circuitry 210. Accordingly, the input routing circuit 302 routes the input signal 202 to the nominal pixel circuitry 210 only if both of the signal SEL_NROW 218 and the signal SEL_NCOL 220 are active. The signal SEL_NROW 218 is active if the nominal sub-row of the nominal pixel circuitry 210 is functional (e.g., non-defective). The signal SEL_NCOL 220 is active if the nominal sub-column of the nominal pixel circuitry 210 is functional. The switch 314 and the switch 316 are connected in parallel to route the input signal 202 to the redundant pixel circuitry 212 if either of the signal SEL_RROW 230 or the signal SEL_RCOL 232 is active. The signal SEL_RROW 230 is active if the nominal sub-row of the nominal pixel circuitry 210 is defective. The signal SEL_RCOL 232 is active if the nominal sub-column of the nominal pixel circuitry 210 is defective. The signal SEL_RROW 230 is an inverted version of the signal SEL_NROW 218 and the signal SEL_RCOL 232 is an inverted version of the signal SEL_NCOL 220 in some implementations of sensor pixel 104.

Figure 4:
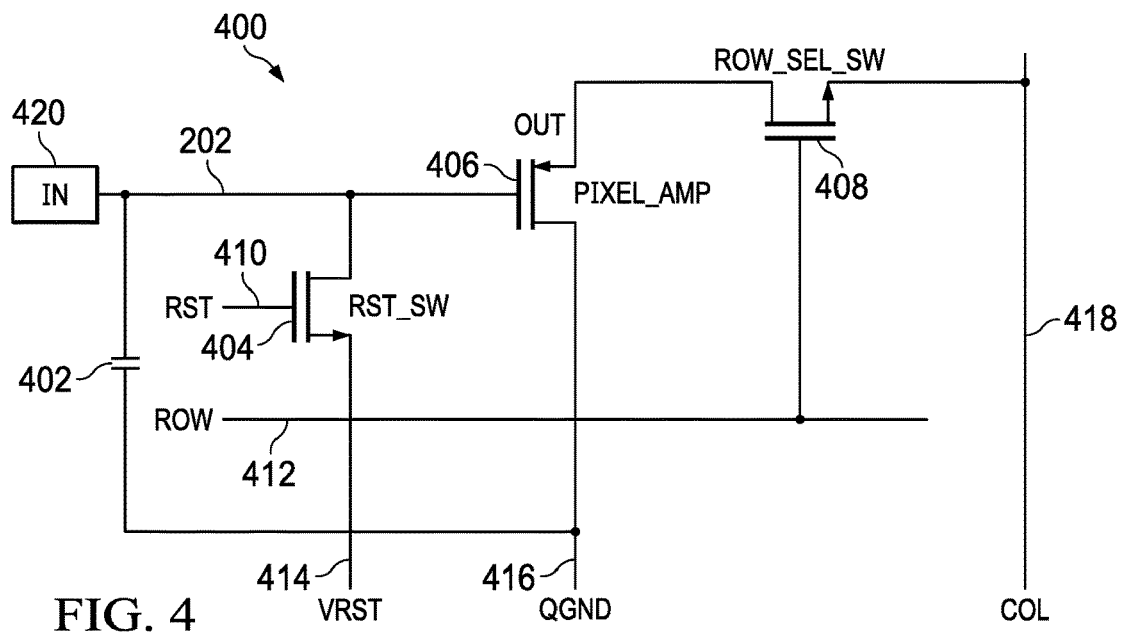
FIG. 4 shows a schematic diagram for a pixel circuit of an active pixel sensor in accordance with various examples.

FIG. 4 shows a schematic diagram for a pixel circuit 400 of an active pixel sensor 104 in accordance with various examples. The pixel circuit 400 is suitable for use in the nominal pixel circuitry 210 and the redundant pixel circuitry 212. The pixel circuit 400 includes a capacitor 402, a reset switch 404, an amplifier transistor 406, and a select switch 408. Implementations of the pixel circuit 400 includes various components that have been omitted from FIG. 4 in the interest of clarity. The capacitor 402 filters or stores a sample of the input signal 202. A top plate of the capacitor 402 is coupled to an input terminal 420 via which the pixel circuit 400 receives the input signal 202. A bottom plate of the capacitor 402 is coupled to a signal QGND 416. In the sensor pixel 104, the capacitor 402 is coupled to the switch 312, or to the switch 314 and switch 316. The signal QGND 416 is the signal QGND_N 222 or the signal QGND_R 234. The reset switch 404 selectably connects the top plate of the capacitor 402 to the signal VRST 414. The reset switch 404 is controlled by the signal RST 410, such that when the signal RST 410 is active the top plate of the capacitor 402 is connected to the signal VRST 414. In the sensor pixel 104, the signal VRST 414 is the signal VRST_N 224 or the signal VRST_R 236.

The amplifier transistor 406 amplifies the voltage on the top plate of the capacitor 402. The amplifier transistor 406 is a metal oxide semiconductor field effect transistor in some implementations of the 400. The gate terminal of the amplifier transistor 406 is coupled to the top plate of the capacitor 402. The drain terminal of the amplifier transistor 406 is coupled to the signal QGND 416. The source terminal of the amplifier transistor 406 is coupled to the select switch 408. The select switch 408 selectably connects the output of the amplifier transistor 406 to an output terminal 418 of the pixel circuit 400. A control terminal of the select switch 408 is coupled to the signal ROW 412, such that when the signal ROW 412 is active the select switch 408 connects the output of the amplifier transistor 406 to the output terminal 418. In some implementations, the select switch 408 is metal oxide semiconductor field effect transistor. In the sensor pixel 104, the signal ROW 412 is the signal ROW_N 214 or the signal ROW_R 226. The output terminal 418 provides the output 306 or the output 308.

Figure 5:
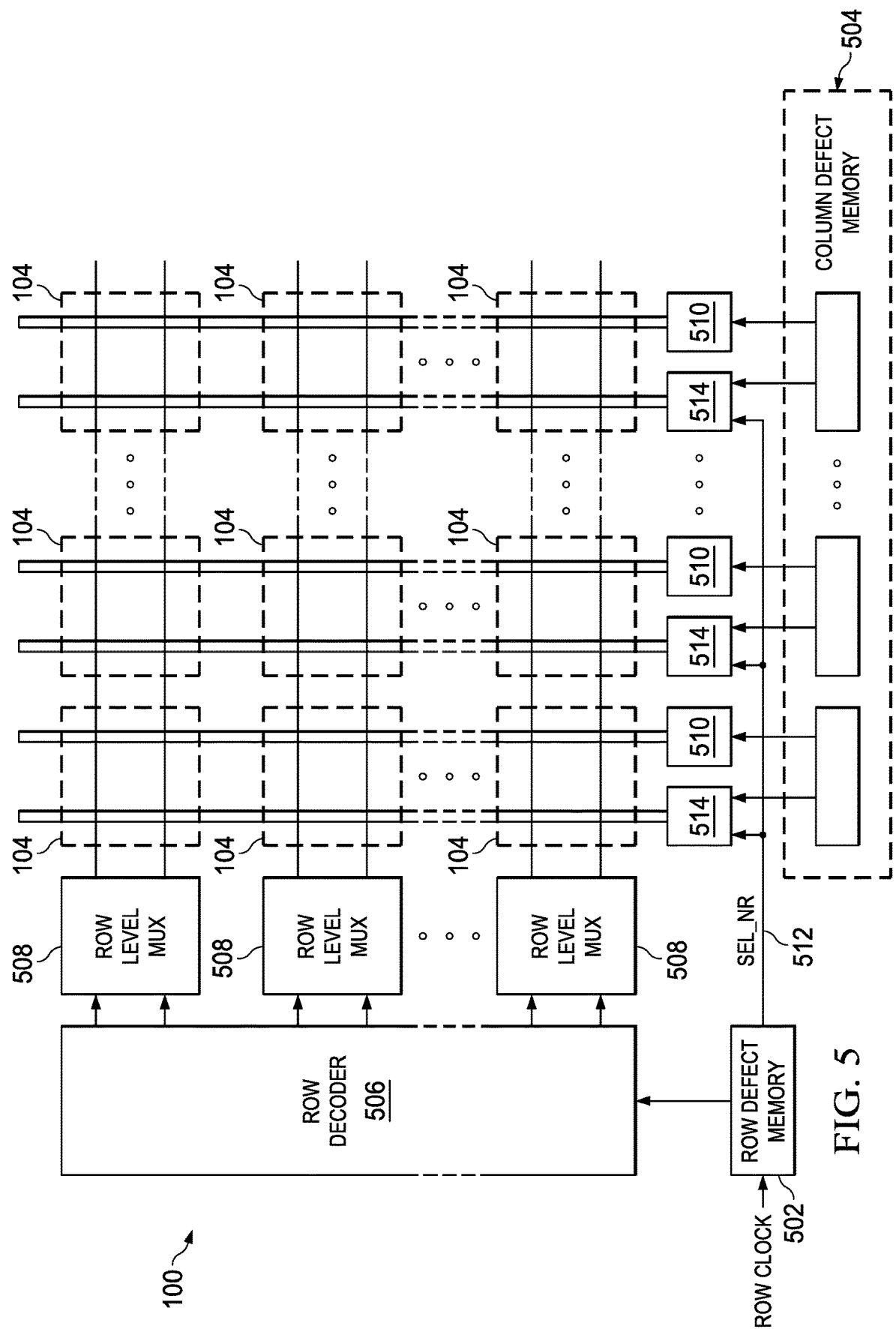
FIG. 5 shows a block diagram for row and column control in an active pixel sensor in accordance with various examples.

FIG. 5 shows a block diagram for the active pixel sensor 100 showing row and column control in accordance with various examples. To ensure effective use of the redundancy provided by the nominal pixel circuitry 210 and the redundant pixel circuitry 212, the active pixel sensor 100 includes row and column level circuitry to mitigate various faults. The active pixel sensor 100 includes a row defect memory 502, a column defect memory 504, a row decoder 506, a plurality of row level multiplexers 508, a plurality of global column signal multiplexers 510, and a plurality of column output multiplexer circuits 514. The row decoder 506 selects a row of the sensor pixel 104 to read and generates the row control signals provided to the sensor pixel 104. The row defect memory 502 stores defect information for each row of the active pixel sensor 100. For example, the row defect memory 502 stores defect information for each nominal sub-row and each redundant sub-row of the active pixel sensor 100. The row defect memory 502 is coupled to the row decoder 506, and the row decoder 506 is coupled to the row level multiplexers 508.

The column defect memory 504 stores defect information for each column of the active pixel sensor 100. For example, the column defect memory 504 stores defect information for each nominal sub-column and each redundant sub-column of the active pixel sensor 100. The defect information is derived from testing of the active pixel sensor 100 performed during or after manufacture of the active pixel sensor 100. The testing identifies faults in the active pixel sensor 100 that affect individual sensor pixels 104, rows of sensor pixels 104, and/or columns of sensor pixels 104. More specifically, the testing identifies faults in the active pixel sensor 100 that affect nominal pixel circuitry 210, nominal sub-rows, nominal sub-columns, redundant pixel circuitry 212, redundant sub-rows, and/or redundant sub-columns.

In the active pixel sensor 100, shorts between various signal conductors cause different types of failures. For example, a short between a row control signal and ground causes a row failure, a short between a column signal and ground causes a column failure, and a short between a row control signal and a column signal causes a panel failure. Shorting of signals can occur in the metal layers or in transistor defects of the sensor pixel 104. The row level multiplexers 508 and the global column signal multiplexers 510 help to reduce the impact of various faults occurring in the sensor pixel 104.

A row failure occurs if one row control signal (e.g. ROW_N 214) shorts to a second row control signal (e.g., RST_N 216) in a sensor pixel 104. The short causes both signals to go to an arbitrary voltage that is dictated by the output impedance of the signal's drivers. If the arbitrary voltage causes the select switch 408 to turn on (fully or partially), then all nominal sub-columns of the row are lost and the panel is deemed to have failed. Such shorts also cause flow of an arbitrary power supply current. The row level multiplexer 508 gates the row control signals (e.g., ROW_N 214, RST_N 216, ROW_R 226, RST_R 228) with row defect information provided by the row defect memory 502. For example, the row decoder 506 passes the row defect information provided by the row defect memory 502 to the row level multiplexers 508. If the row defect information indicates that a row is defective, then the row level multiplexer 508 coupled to the row drives the associated row control signals to a predetermined voltage (e.g., ground or a high-impedance state), thereby preventing a drive conflict that results in unwanted power supply current flow and panel failure.

As explained with respect to FIG. 3, the input routing circuit 302 routes the input signal 202 to either the nominal pixel circuitry 210 or the redundant pixel circuitry 212 in response to column and row defect information. Information is read from the sensor pixels 104 row by row. Thus, when reading a given row, the active pixel sensor 100 selects either the nominal sub-column or the redundant sub-column based on row and column defect information provided by the row defect memory 502 and the column defect memory 504. The column output multiplexer circuit 514 selects between the nominal sub-column or the redundant sub-column based on row and column defect information provided by the row defect memory 502 and the column defect memory 504. The column output multiplexer circuit 514 selects the nominal sub-column if the row and column of the sensor pixel 104 are not defective. The column output multiplexer circuit 514 selects the redundant sub-column if either the row or column of the sensor pixel 104 is defective. The row defect memory 502 provides row defect information for each row to the column output multiplexer circuits 514. For example, the signal SEL_NR 512 changes with each row to provide the defect information for the current row. The column output multiplexer circuits 514 select the nominal sub-column or the redundant sub-column based on the defect information for the current row retrieved from the row defect memory 502 and the defect information for the column provided by the column defect memory 504.

If two signals that are shared between columns are shorted at a sensor pixel 104, then a panel failure may result because the shorted signals affect all columns. To prevent such a short from causing a panel failure, the active pixel sensor 100 provides separate and independent signal routing for all global signals (e.g., power and control signals such as QGND and VRST) to each column and row. The global column signal multiplexer 510 drives such signals to each column. If a short is detected, then the defect information provided by the column defect memory 504 indicates the defect to the global column signal multiplexer 510, and the global column signal multiplexer 510 drives the shorted signals for the column to a same voltage, or transitions the drivers for the shorted signals to a high-impedance state, thereby preventing a panel failure.

In the sensor pixel 104, the nominal pixel circuitry 210 and the redundant pixel circuitry 212 are placed relatively close to one another (e.g., within a 50 micrometer (um) by 50 um area). Yield of the active pixel sensor 100 can be improved by placing the nominal pixel circuitry 210 and the redundant pixel circuitry 212 as far apart as possible within 50 um×50 um area, but this will in-turn increase the probability of adjacent row/column failure. In the sensor pixel 104 of the present disclosure, the nominal pixel circuitry 210 and the redundant pixel circuitry 212 are placed to reduce the likelihood of failure of the nominal pixel circuitry 210 and the redundant pixel circuitry 212, and the failure of rows and columns adjacent to the sensor pixel 104.

Figure 6:
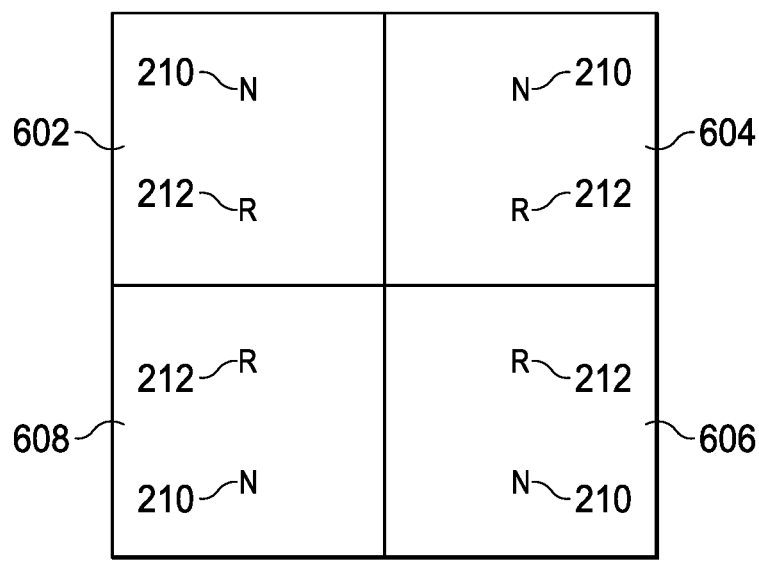
FIG. 6 shows an arrangement of four pixel circuits in an active pixel sensor in accordance with various examples.

FIG. 6 shows an example of arrangement of four pixel circuits in the active pixel sensor 100 in accordance with various examples. FIG. 6 shows a set of four sensor pixels: a sensor pixel 602, a sensor pixel 604, a sensor pixel 606, and a sensor pixel 608, each of which is an implementation of the sensor pixel 104. In each of the sensor pixels 602, 604, 606, 608, the nominal pixel circuitry 210 and redundant pixel circuitry 212 are placed as far apart from one another as possible to reduce the likelihood that a defect in one of the nominal pixel circuitry 210 or redundant pixel circuitry 212 affects the other of the nominal pixel circuitry 210 or redundant pixel circuitry 212. The pixel arrangement of FIG. 6 places the redundant pixel circuitry 212 of the each of the sensor pixels 602, 604, 606, and 608 nearer to the redundant pixel circuitry 212 of each other sensor pixel 602, 604, 606, 608 of the four pixel group than to the nominal pixel circuitry 210 of each other sensor pixel 602, 604, 606, 608 of the four pixel group. As a result, the likelihood that a defect in the redundant pixel circuitry 212 of one of the sensor pixels 602-608 affects the nominal pixel circuitry 210 of one of the adjacent sensor pixels 602-608 is reduced.

In the active pixel sensor 100, the relationship of yield to metal and vertical interconnect access (via) is a function of metal shorts and via opens. An open in a via causes a single pixel defect provided that routing of row and/or column signals that are connected to multiple sensor pixel 104 do not include jumper metals. In the active pixel sensor 100, row and/or column signals, such as ROW_N 214, RST_N 216, ROW_R 226, RST_R 228, QGND_N 222, VRST_N 224, QGND_R 234, VRST_R 236, output 306, output 308, etc. that are connected to multiple sensor pixel 104 do not include jumper metals. In the active pixel sensor 100, vias conducting row and column signals are not connected using jumper metals to reduce the likelihood row or column failure.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An active pixel sensor, comprising:
a plurality of sensor pixels disposed in a row;
a plurality of sensor pixels in a column; and
steering circuitry coupled to each of the sensor pixels;
wherein each of the sensor pixels comprises:
a first pixel circuit; and
a second pixel circuit; and
for each of the sensor pixels, the steering circuitry comprises:
a first switch and a second switch connected in series to route an input signal to the first pixel circuit; and
a third switch and a fourth switch connected in parallel to route the input signal to the second pixel circuit;
wherein the steering circuitry is configured to route the input signal to the second pixel circuit based on a row in which the first pixel circuit is disposed being defective or a column in which the first pixel circuit is disposed being defective.

2. An active pixel sensor, comprising:
a plurality of sensor pixels disposed in a row;
a plurality of sensor pixels in a column; and
steering circuitry coupled to each of the sensor pixels;
wherein each of the sensor pixels comprises:
a first pixel circuit; and
a second pixel circuit; and
for each of the sensor pixels, the steering circuitry comprises:
a first switch and a second switch connected in series to route an input signal to the first pixel circuit; and
a third switch and a fourth switch connected in parallel to route the input signal to the second pixel circuit;
further comprising:
a row defect memory to store information indicating whether a row in which the first pixel circuit is disposed is defective; and
a row multiplexer coupled to the row defect memory, the row multiplexer to set control signals for the row to a predetermined voltage responsive to the information stored in the row defect memory indicating that the row is defective.

3. The active pixel sensor of claim 2, further comprising:
a column defect memory to store information indicating whether a column in which the first pixel circuit is disposed is defective; and
a first column multiplexer coupled to the row defect memory and the column defect memory, the first column multiplexer configured to select the second pixel circuit responsive to the information stored in the row defect memory indicating that the row in which the first pixel circuit is disposed is defective, or the information stored in the column defect memory indicating that the column in which the first pixel circuit is disposed is defective.

4. The active pixel sensor of claim 3, further comprising a second column multiplexer configured to set control signals for the column to a predetermined voltage responsive to information retrieved from the column defect memory indicating that one of the control signals is shorted to a different signal.

5. An active pixel sensor, comprising:
a plurality of sensor pixels disposed in a row;
a plurality of sensor pixels in a column; and
steering circuitry coupled to each of the sensor pixels;
wherein each of the sensor pixels comprises:
a first pixel circuit; and
a second pixel circuit; and
for each of the sensor pixels, the steering circuitry comprises:
a first switch and a second switch connected in series to route an input signal to the first pixel circuit; and a third switch and a fourth switch connected in parallel to route the input signal to the second pixel circuit;
wherein for four adjoining sensor pixels, circuitry of the second pixel circuit of a given one of the four adjoining sensor pixels is disposed nearer the circuitry of the second pixel circuit of each of the other four adjoining sensor pixels than to the circuitry of the first pixel circuit of the each of the other four adjoining sensor pixels.

6. An active pixel sensor, comprising:
a plurality of sensor pixels disposed in a row;
a plurality of sensor pixels in a column; and
steering circuitry coupled to each of the sensor pixels;
wherein each of the sensor pixels comprises:
a first pixel circuit; and
a second pixel circuit; and
for each of the sensor pixels, the steering circuitry comprises:
a first switch and a second switch connected in series to route an input signal to the first pixel circuit; and
a third switch and a fourth switch connected in parallel to route the input signal to the second pixel circuit;
wherein vertical interconnect accesses in conductors for row control signals and conductors for column control signals are not connected by jumper metal.

7. An active pixel sensor, comprising:
an array of sensor pixels arranged as a plurality of rows and a plurality of columns, each of the sensor pixels comprising:
a first pixel circuit; and
a second pixel circuit;
a row defect memory to store information indicating whether a row in which a given one of the first pixel circuits is disposed is defective;
a column defect memory to store information indicating whether a column in which a given one of the first pixel circuits is disposed is defective; and
for each of the columns, a first column multiplexer coupled to the row defect memory, the column defect memory, and a column of the sensor pixels, wherein the first column multiplexer is configured to select the second pixel circuit responsive to the information stored in the row defect memory indicating that a row in which the first pixel circuit is disposed is defective, or the information stored in the column defect memory indicating that the column in which the first pixel circuit is disposed is defective.

8. The active pixel sensor of claim 7, wherein each of the sensor pixels comprises steering circuitry, the steering circuitry comprising:
a first switch and a second switch connected in series to route an input signal to the first pixel circuit; and
a third switch and a fourth switch connected in parallel to route the input signal to the second pixel circuit.

9. The active pixel sensor of claim 8, wherein the steering circuitry is configured to:
route the input signal to the first pixel circuit based on a row in which the first pixel circuit is disposed being functional and a column in which the first pixel circuit is disposed being functional; and
route the input signal to the second pixel circuit based on a row in which the first pixel circuit is disposed being defective or a column in which the first pixel circuit is disposed being defective.

10. The active pixel sensor of claim 7, further comprising, for each of the rows, a row multiplexer coupled to the row defect memory, the row multiplexer configured to set control signals for the row to a predetermined voltage responsive to the information stored in the row defect memory indicating that the row is defective.

11. The active pixel sensor of claim 7, further comprising, for each of the columns, a second column multiplexer configured to set control signals for the column to a predetermined voltage responsive to a determination that one of the control signals is shorted to a different signal.

12. The active pixel sensor of claim 7, wherein, in the active pixel sensor, power supply signals and control signals are routed independently to each of the rows and columns of sensor pixels.

13. The active pixel sensor of claim 7, wherein, for four adjoining sensor pixels, circuitry of the second pixel circuit of a given one of the four adjoining sensor pixels is disposed nearer the circuitry of the second pixel circuit of each of the other four adjoining sensor pixels than to the circuitry of the first pixel circuit of the each of the other four adjoining sensor pixels.

14. The active pixel sensor of claim 7, wherein vertical interconnect accesses in conductors for row control signals and conductors for column control signals are not connected by jumper metal.

15. An active pixel sensor, comprising:
a plurality of sensor pixels disposed in a row;
a plurality of sensor pixels disposed in a column; and
steering circuitry coupled to each of the sensor pixels;
a row defect memory;
a column defect memory;
a row multiplexer coupled to the row defect memory and the row of sensor pixels;
a first column multiplexer coupled to the row defect memory, the column defect memory, and the column of sensor pixels; and
a second column multiplexer coupled to the column of sensor pixels;
wherein each of the sensor pixels comprises:
a first pixel circuit; and
a second pixel circuit; and
for each of the sensor pixels the steering circuitry comprises:
a first switch and a second switch connected in series to couple the first pixel circuit to an input terminal; and
a third switch and a fourth switch connected in parallel to couple the second pixel circuit to the input terminal.

16. The active pixel sensor of claim 15, wherein:
the row multiplexer is configured to set control signals for the row to a predetermined voltage responsive to the information stored in the row defect memory indicating that the row is defective;
the first column multiplexer is configured to select the second pixel circuit responsive to the information stored in the row defect memory indicating that the row in which the first pixel circuit is disposed is defective, or the information stored in the column defect memory indicating that the column in which the first pixel circuit is disposed is defective; and
the second column multiplexer is configured to set control signals for the column to a predetermined voltage responsive to a determination that one of the control signals is shorted to a different signal.

17. The active pixel sensor of claim 15, wherein for four adjoining sensor pixels, the second pixel circuit of a given one of the four adjoining sensor pixels is disposed nearer the second pixel circuit of each of the other four adjoining sensor pixels than to the first pixel circuit of the each of the other four adjoining sensor pixels.

* * * * *